United States Patent [19]
Phillips

[11] 3,816,381
[45] June 11, 1974

[54] PROCESS FOR COPOLYMIZING α-PINENE AND β-PINENE UTILIZING A SICL$_4$-AlCl$_3$ COCATALYST SYSTEM

[75] Inventor: Ronald Frank Phillips, New Milford, Conn.

[73] Assignee: Arizona Chemical Company, New York, N.Y.

[22] Filed: Dec. 27, 1972

[21] Appl. No.: 318,947

[52] U.S. Cl............................................. 260/88.2 D
[51] Int. Cl. .............................................. C08f 1/72
[58] Field of Search....................... 260/88.2 D, 93.3

[56] References Cited
UNITED STATES PATENTS
3,478,007  11/1969  Barkley et al...................... 260/88.2

Primary Examiner—Stanford M. Levin

[57] ABSTRACT

There is provided a process for effecting the copolymerization in a substantially anhydrous medium of α-pinene β-pinene in an inert solvent utilizing a mixture of silicon tetrachloride and aluminum trichloride as a polymerization catalyst system.

3 Claims, No Drawings

PROCESS FOR COPOLYMIZING α-PINENE AND β-PINENE UTILIZING A SiCl₄AlCl₃ COCATALYST SYSTEM

The present invention relates to a process for preparing polyterpenes. More particularly, it relates to a process for preparing copolymers of α-pinene and β-pinene, employing an aluminum chloride-silicon tetrachloride cocatalyst system. Still more particularly, it relates to a catalyst system consisting of silicon tetrachloride and aluminum chloride, particularly adapted to copolymerize α-pinene and β-pinene, whereby resultant copolymers find utility in hot-melt or pressure-sensitive applications.

It is known that copolymers of α-pinene and β-pinene can be prepared. However, none of the methods is wholly satisfactory, since generally the polymerization reaction cannot be readily controlled, yields are low and organic catalysts employed are expensive, difficult to handle, and not readily available. If an inexpensive process for effecting the copolymerization of α- and β-pinenes could be devised, while avoiding the use of organic catalysts and obtaining high yields, such a process would fulfill a long-felt need.

It is, therefore, a principal object of the invention to provide a process for effecting the copolymerization of α- and β-pinenes in an economical and straightforward manner. It is a further object of the invention to copolymerize α- and β-pinenes in the presence of an inorganic cocatalyst system. It is still a further object to provide a cocatalyst system consisting of silicon tetrachloride and aluminum chloride. Other objects will become apparent from a consideration of the ensuing description.

According to the process of the invention, there is added to a suitable solvent containing a silicon tetrachloride-aluminium chloride cocatalyst mixture admixed therewith, a mixture of α- and β-pinene monomers in a weight ratio ranging from 90 to 40 parts of α-pinene and from 10 to 60 parts of β-pinene at a temperature ranging from about minus (−) 20° C to about plus (+) 40° C for a time sufficient to reduce the monomer content to substantially a zero value. Further, both solvent and the monomer mixture are dried over a molecular sieve prior to use, while the reaction equipment is dried prior to use by heating above 100° C. to maximize yields of desired polymer. The solvent medium which contains the copolymer is next treated with water, a suitable acid such as dilute hydrochloric acid, or clay and lime in order to inactivate and remove the catalyst. The solvent is next removed from the mixture and a high melting polymer is obtained in good yield.

In general, from about 1.0% to about 10%, and preferably from 2% to 6%, of the catalyst system is employed based on the weight of monomers present is admixed with a solvent, such as toluene, xylene, or the like. The catalyst system consists of a mixture ranging from about one to two parts, by weight, of silicon tetrachloride and from about five to ten parts by weight, of aluminum chloride.

Polymerization is effected over a temperature range from about −20° C to about +40° C and, preferably, from about 20° C to 25° C. The temperature is controlled by incorporating the α-pinene and β-pinene mixture in small increments. Cooling is provided to maintain the aforementioned temperature range. Resulting polymers are characterized as having a softening point ranging from 60° C to 125° C as determined by the Ring and Ball Method, ASTM 58T.

The solvent employed in the process of the invention can be either an aromatic hydrocarbon or a chloroaliphatic compound. Illustrative of the latter are benzene, toluene, paraxylene, mixed xylene, ethyl benzene, and methylene dichloride.

In order that the present invention may be more completely understood, the following examples are set forth in which all parts are by weight unless otherwise noted. These examples are set forth primarily for the purpose of illustration and any specific enumeration of detail should not be interpreted as limitative except as indicated in the appended claims.

EXAMPLE 1

To a suitable reaction vessel is added an anhydrous catalyst mixture consisting of 1 part of silicon tetrachloride and 5 parts of aluminum chloride admixed with 75 parts of toluene. A monomer feed mixture consisting of 50 parts of α-pinene and 50 parts of β-pinene is next added incrementally to the reaction mixture over a period of 1 hour at a temperature maintained at from 20° C to 25° C with cooling as required. When all the monomer feed has been added, the mixture is stirred for an additional hour at 25° C and then treated with dilute hydrochloric acid to destroy the catalyst. The mixture is washed with water until neutral. Finally, the solvent is removed so as to obtain a yield of 76% of high melting point resin.

On analysis, the copolymer has the following characteristics:
Molecular weight: 950
Softening Point: Ring and Ball Method (ASTM-58): 120° C

EXAMPLE 2

Following the procedure of Example 1 except that titanium tetrachloride is substituted for silicon tetrachloride in the cocatalyst mixture, a copolymer of α-pinene and β-pinene could not be obtained.

EXAMPLE 3

The procedure of Example 1 is repeated except that the cocatalyst mixture contains 1 part of silicon tetrachloride and 10 parts of aluminum chloride. Resultant copolymer product is substantially the same as indicated in Example 1 above.

EXAMPLE 4

The procedure of Example 1 is followed in every respect except that the monomer feed mixture consists of 40 parts of α-pinene and 60 parts of β-pinene. A 78% yield of 120° C softening resin is obtained and the molecular weight is determined to be 965.

EXAMPLE 5

Repeating the procedure of Example 1 in every detail except that the monomer feed mixture consists of 90 parts of α-pinene and 10 parts of β-pinene, a 60% yield of 95° C softening resin having a molecular weight 750 (ring and ball) is obtained.

I claim:

1. A process for the preparation of α and β pinene copolymers which comprises: intimately contacting a substantially anhydrous mixture of from 90 parts to 40 parts by weight of α-pinene and from 10 to 60 parts, by weight, of β-pinene in the presence of an aromatic hydrocarbon solvent or a chlorinated aliphatic solvent admixed with from about 1% to 10%, based on the weight of the monomers, of a catalyst system consisting of from 1 to 2 parts, by weight, of silicon tetrachloride and from 5 to 10 parts of aluminum chloride, maintaining the temperature of contact from about −20° C to about +40° C for a time sufficient to effect copolymerization, and recovering resultant copolymer from the reaction mixture.

2. The process according to claims 1 wherein the temperature of contact is between +20° C and +25° C.

3. The process according to claim 1 wherein the cocatalyst consists of 1 part of silicon tetrachloride and 5 parts of aluminum chloride.

* * * * *